(12) United States Patent
Webber

(10) Patent No.: X8799
(45) Date of Patent: Apr. 22, 1835

(54) CHEESE, TURNING & CURING

(76) Inventor: Henry Webber

United States Patent

Patent No.: X8799

Henry Webber
Letters Patent

The schedule referred to in these Letters Patent and making part of the same containing a description in the words of the said Henry Webber himself of his improvement in a machine for turning & curing cheese

---

To all to whom these presents shall come. Be it known that I Henry Webber of Richfield in the County of Otsego and State of New York have invented a new and useful semi-Revolving Cheese shelf and that the following is a full & exact description thereof. The semi-revolving cheese shelves consist of a frame in to which double shelves are placed. The frame is made of three distinct frames put together the centre frame being as wide as the two outside ones. The cleets on which the shelves rest run parallel with each other across the frames to which the shelves are fastened the one the upper side & the other the lower side alternately. One half the shelves are nailed or fastened to the outside frames the other to the inside frame which is shorter than the outside frames, and is raised (with the shelves attached to it together with the cheese on the same) by a windlass until the cheese touch the shelves above them which are fastened to the outside frames. when the whole is ready for turning, which is done by a shaft or axle passing through the centre of the frame and is supported by strong posts placed permanent in the cheese house; In order to have the centre frame (with its shelves) move the shaft or axle (on which the whole rests & turns) passes through a plank or cross-bar fastened to the outside frames with a mortice in the centre frame which leaves it free to move up or down by windlasses placed at top and bottom across the frame. By the above process the cheese are easily compressed between the shelves the frame being either end up). The frame turns half round and to prevent the cheese from sliding out while turning slats are fastened to the back of the frame & shelves which may be made supports for the shelves & frame when necessary). Two narrow slats may be placed in front (in the centre) as supports. The first slat is fastened to the 1st o?

3d 5th &c (shelves) the second is fastened to 2nd 4th 6th &c and to the frame at top & bottom. Now what I claim as my own invention and not previously known is the principle of comprefsing the cheese for turning between two series of shelves one stationary and the other moveable in the manner herein set forth and also the right of varying the same so as to produce similar results by analogous means Witnefses Daniel Daw Jr William C. Nash Henry Webber

E. W.

Ch. J. W.

481 wds